US010185971B2

(12) United States Patent
Hood et al.

(10) Patent No.: US 10,185,971 B2
(45) Date of Patent: Jan. 22, 2019

(54) SYSTEMS AND METHODS FOR PLANNING AND EXECUTING AN ADVERTISING CAMPAIGN TARGETING TV VIEWERS AND DIGITAL MEDIA VIEWERS ACROSS FORMATS AND SCREEN TYPES

(71) Applicant: Adobe Systems Incorporated, San Jose, CA (US)

(72) Inventors: Alexander R. Hood, Oakland, CA (US); Jason Lopatecki, San Francisco, CA (US); Justin K. Sung, Berkeley, CA (US); David Innes-Gawn, Atwater, CA (US); John M. Trenkle, Albany, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 494 days.

(21) Appl. No.: 14/923,183

(22) Filed: Oct. 26, 2015

(65) Prior Publication Data

US 2016/0117720 A1 Apr. 28, 2016

Related U.S. Application Data

(60) Provisional application No. 62/069,213, filed on Oct. 27, 2014.

(51) Int. Cl.
*G06Q 30/00* (2012.01)
*G06Q 30/02* (2012.01)
(Continued)

(52) U.S. Cl.
CPC ... *G06Q 30/0244* (2013.01); *H04N 21/25891* (2013.01); *H04N 21/44204* (2013.01);
(Continued)

(58) Field of Classification Search
None
See application file for complete search history.

(56) References Cited

U.S. PATENT DOCUMENTS 5,600,364 A 2/1997 Hendricks et al.
6,286,005 B1 9/2001 Cannon
(Continued)

FOREIGN PATENT DOCUMENTS

WO WO-01/07985 2/2001
WO WO-2009/012235 1/2009
(Continued)

OTHER PUBLICATIONS

U.S. Appl. No. 14/923,153, filed Jul. 7, 2017, Office Action.
(Continued)

*Primary Examiner* — Alvin L Brown
(74) *Attorney, Agent, or Firm* — Keller Jolley Preece

(57) ABSTRACT

Systems and methods are disclosed for analyzing a fused sample of viewership data to determine a behavior profile of online viewers who watched and/or didn't watch certain TV advertisements, where the TV advertisements are aligned with campaign targeting characteristics desired by an advertiser/client working with a demand side platform. Then, a campaign targeting plan is developed for dividing an advertising budget between digital media and TV impressions. The digital media portion of the campaign profiles Media Properties (MPs) contained in a historical database from past digital advertising campaigns across multiple digital formats and screens, and aligns digital ad placement with MPs having desired targeting characteristics. An optimized apportionment is automatically produced between TV and digital media spending based on an advertiser/client's goals of duplicating or not duplicating viewership of an advertisement between TV and digital media, or alternately based
(Continued)

on cost alone. Alternately, the apportionment can be guided interactively.

30 Claims, 14 Drawing Sheets

(51) Int. Cl.
*H04N 21/258* (2011.01)
*H04N 21/81* (2011.01)
*H04N 21/442* (2011.01)
*H04N 21/25* (2011.01)
*H04N 21/2547* (2011.01)
*H04N 21/45* (2011.01)
*H04N 21/84* (2011.01)

(52) U.S. Cl.
CPC ......... *H04N 21/812* (2013.01); *H04N 21/252* (2013.01); *H04N 21/2547* (2013.01); *H04N 21/4532* (2013.01); *H04N 21/84* (2013.01)

(56) References Cited

U.S. PATENT DOCUMENTS

| | | |
|---|---|---|
| 8,112,301 B2 | 2/2012 | Harvey et al. |
| 8,627,359 B2 | 1/2014 | Kitts et al. |
| 8,768,766 B2 | 7/2014 | Ellis et al. |
| 8,874,652 B1 | 10/2014 | Pecjak et al. |
| 9,501,783 B2 | 11/2016 | Hood et al. |
| 2005/0246736 A1 | 11/2005 | Beyda et al. |
| 2006/0212350 A1 | 9/2006 | Ellis et al. |
| 2007/0073563 A1 | 3/2007 | Grouf et al. |
| 2007/0157228 A1 | 7/2007 | Bayer et al. |
| 2007/0220575 A1 | 9/2007 | Cooper et al. |
| 2007/0250901 A1 | 10/2007 | McIntire et al. |
| 2007/0261072 A1 | 11/2007 | Boulet et al. |
| 2007/0288953 A1 | 12/2007 | Sheeman et al. |
| 2008/0022301 A1 | 1/2008 | Aloizos |
| 2008/0040739 A1 | 2/2008 | Ketchum et al. |
| 2008/0072251 A1 | 3/2008 | Namvar |
| 2008/0250447 A1 | 10/2008 | Rowe et al. |
| 2008/0271070 A1 | 10/2008 | Kanojia et al. |
| 2009/0006145 A1 | 1/2009 | Duggal et al. |
| 2009/0077579 A1 | 3/2009 | Li et al. |
| 2009/0150405 A1* | 6/2009 | Grouf ................. G06F 17/3005 |
| 2009/0177542 A1 | 7/2009 | Haberman et al. |
| 2009/0197582 A1* | 8/2009 | Lewis ..................... H04W 4/02 455/414.2 |
| 2009/0248478 A1 | 10/2009 | Duggal et al. |
| 2009/0292587 A1* | 11/2009 | Fitzgerald .............. G06Q 30/02 705/7.29 |
| 2010/0313218 A1 | 12/2010 | Niemeijer et al. |
| 2011/0107259 A1* | 5/2011 | Haugh .................. G06F 3/0482 715/810 |
| 2011/0225608 A1 | 9/2011 | Lopatecki et al. |
| 2011/0288907 A1 | 11/2011 | Harvey et al. |
| 2012/0042338 A1 | 2/2012 | Kitts et al. |
| 2012/0084813 A1 | 4/2012 | Dmitriev et al. |
| 2012/0167125 A1 | 6/2012 | Grubb |
| 2012/0215622 A1 | 8/2012 | Ramer et al. |
| 2013/0218640 A1 | 8/2013 | Kidder et al. |
| 2014/0195334 A1 | 7/2014 | Emans et al. |
| 2014/0196081 A1 | 7/2014 | Emans et al. |
| 2014/0278912 A1 | 9/2014 | Hughes et al. |
| 2014/0325551 A1 | 10/2014 | McMillan |
| 2016/0100788 A1* | 4/2016 | Sano .................. A61B 5/6898 600/595 |
| 2016/0117719 A1 | 4/2016 | Hood et al. |
| 2016/0119689 A1 | 4/2016 | Hood et al. |
| 2017/0055043 A1 | 2/2017 | Hood et al. |

FOREIGN PATENT DOCUMENTS

| | | |
|---|---|---|
| WO | WO-2009/050546 | 4/2009 |
| WO | WO-2014/066619 | 5/2014 |

OTHER PUBLICATIONS

U.S. Appl. No. 15/297,841, filed Jul. 18, 2017, Office Action.
U.S. Appl. No. 14/716,774, filed May 5, 2017, Office Action.
"Office Action dated Nov. 2, 2016; U.S. Appl. No. 14/923,153", (Nov. 2, 2016).
U.S. Appl. No. 14/716,737, filed Apr. 6, 2016, Office Action.
U.S. Appl. No. 14/716,737, filed Jul. 19, 2016, Notice of Allowance.
U.S. Appl. No. 15/297,841, filed Feb. 10, 2017, Office Action.
Copending U.S. Appl. No. 14/923,153, filed Oct. 26, 2016.
U.S. Appl. No. 14/923,153, filed Jan. 2, 2018, Office Action.
U.S. Appl. No. 15/297,841, filed Dec. 27, 2017, Office Action.
U.S. Appl. No. 14/716,774, filed Dec. 18, 2017, Office Action.
U.S. Appl. No. 15/297,841, dated Aug. 2, 2018, Notice of Allowance.
U.S. Appl. No. 14/716,774, dated Jul. 3, 2018, Office Action.

* cited by examiner

Fig. 9

SYSTEMS AND METHODS FOR PLANNING AND EXECUTING AN ADVERTISING CAMPAIGN TARGETING TV VIEWERS AND DIGITAL MEDIA VIEWERS ACROSS FORMATS AND SCREEN TYPES

CROSS-REFERENCE TO RELATED APPLICATIONS

This application claims the benefit of U.S. Provisional Patent Application No. 62/069,213 filed Oct. 27, 2014.

BACKGROUND OF THE INVENTION

1. Field of the Invention

The present invention relates generally to systems and methods for planning and managing advertising campaigns that include both digital media advertising and TV advertising across one or more digital formats and screens.

2. Prior Art

In the RTB (Real-Time Bidding) environment for electronic media impression auctions, an electronic advertising agency/consolidator operating a demand-side platform receives billions of daily auction opportunities for electronic media impressions from partners like Google®, Yahoo®, etc. These partners operate auctions for ad impressions and then place electronic ads based on auction results. A partner's auction is considered an external auction with respect to a demand-side platform where an internal auction may also be operated to determine which advertisements, also referred to herein as ads, and bids are submitted to the external auction. Each ad impression opportunity includes information parameters about the ad impression—for example, the target website, geolocation of the user, ad size, user cookie, etc, that are used for targeting purposes. The demand side platform then processes hundreds of ads in their system, supplied by advertiser clients along with desired filtering/targeting parameters, against information parameters supplied by the partner, and filters out any ads that do not qualify (for example the ad does not want to target Youtube.com®). For ads that are not removed due to a mismatch with targeting parameters, the demand-side platform then evaluates the corresponding bids that represent how much each client advertiser is willing to pay. The winning bid in the internal auction is then sent to the external auction to compete for the impression opportunity.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance, there may be no internal auction—just a submission to an external auction.

With the ever increasing growth of digital advertising, advertiser/clients are dealing with splitting their ad budget between TV and digital media. Digital media includes any electronic media format other than TV—essentially all digital formats that can be planned and delivered electronically. Digital media locations where an ad may be placed are called Media Properties. A Media Property or MP as described herein represents a specific instance of a media platform for electronically delivering information to a viewer. An MP as referenced herein usually refers to a website or URL on the Internet, however may also refer for example and without limitation to an App ID, a Game ID, or other digital electronic media including for example electronic billboards—small and large. Even digital watches with wireless connectivity are a form of MP.

As used in describing the invention as defined herein, television or TV includes:
Connected TV;
VOD (Video on Demand);
Broadcast TV;
Cable TV; and
TV programming provided online.

VOD is further defined as systems that allow users to select and watch/listen to video or audio content when they choose to, rather than having to watch at a specific broadcast time. IPTV technology is often used to bring video on demand to televisions and personal computers. Television VOD systems can either stream content through a set-top box, a computer or other device, allowing viewing in real time, or download it to a device such as a computer, digital video recorder (also called a personal video recorder) or portable media player for viewing at any time.

Television programming in general may be therefore viewed on conventional TV sets, or on any digital media viewing device, including without limitation PC/laptops, tablets, smartphones, and even digital watches. A viewer may be either a person, cookie, household, or any group of persons that watch the same programming—regardless of whether or not they watch simultaneously.

Current tools for helping advertisers split their budget between TV and digital media only deal with MP categorizations in aggregate, and typically only with respect to demographic characteristics such as age and gender. Methods are needed to more precisely plan and predict cross format ad campaigns where both TV and digital media are targeted in the same campaign. In particular, it would be useful to plan a campaign such that viewers who did not watch certain TV ads get to see them on digital media. It would also be useful at times to reinforce the viewing of certain TV ads by targeting the same viewers on digital media in order to increase the frequency of viewership of those ads.

Specific problems faced by a planner at an advertiser/client may include (written from the perspective of the planner):
Roughly how much incremental reach can I get by spending a portion of my TV budget on online video?
How do I get a controlled amount of additional frequency of impressions against targets that have likely seen my ads on TV?
Exactly how much should I spend on online video ads based on various goals: budget, frequency, reach, viewable?
How can I execute the digital and television portions of the campaign as easily as possible on an electronic platform, where planning and execution are integrated?
Exactly how much of the next campaign's share of budget should I spend on video?
How much should I spend on VOD and other avenues that provide incremental reach? How can I execute and track my ad spend across all formats easily?

More specifically, a planner may have the following needs and goals (written from the perspective of the planner):
1. As a Planner, I need the latest data to be included in the TV Planning tool so that I can be confident in the results of the tool, by recognizing that the data from my historical TV buy is correct.

2. As a Planner, I need to have access to the correct and up-to-date data from the demand-side platform so that I can compare costs and reach versus my TV buy data historically.
3. As a Planner, I need to view the impact of shifting away some of my historical TV budget to online video advertising (executed via a demand-side platform) so that I can assess the impact of this shift on the unduplicated reach gains I can achieve.
4. As a Planner, I need to be able to easily execute a campaign with a demand-side platform for the online video ad portion based on the hypothetical TV and OLV (digital media) spend that I create in the planner, so that I can save time and reap the benefits around transparency and delivery that the demand-side platform offers.
5. As a Planner, I need to be able to apply a discount to the 'rack rates' that are quoted as 'spend' in the Nielsen TV data so that discounts I received from networks are included in the analysis, making my hypothetical spend plan more realistic.
6. As a Planner, I need to be able to 'save' a draft spending plan that I can access later so that I don't have to set up the analysis again after I've considered the plan over some time.
7. Preferably, the planning tool must be available via a public-facing website so I can easily perform prototype plans.
8. As a Planner, I need to be able to have the planning tool figure out the optimal amount of online video ad spend based on at least three different types of goals given the overall historical TV budget: maximize unduplicated reach at the same budget, maximize frequency at the same budget, and the most cost-effective reach across all available digital and TV formats and screens, so that I can tune my spend optimization to my particular marketing goal.

Definitions

Planner—a user of the invention including one who operates/uses the user interface. A planner may belong to a DSP organization or to an advertiser/client organization.
Media avails or "avails": Unsold units of time available for broadcasters to sell to advertisers. The number of impressions available for purchase on a daily or monthly basis for a given media property.
TV Base Plan: A TV advertising campaign that has already been run and where historical viewer information is available
OT CPM: Cost-per-Impression (per 1,000 impressions) for on-target impressions
Incremental reach: Viewers reached (by the invention) that were not reached by the TV Base Plan
PTV—"Programmatic TV"
CPM—cost per 1,000 impressions
CPP—cost per (GRP) point
eCPM—ad revenue generated per 1,000 impressions
eCPP—ad revenue generated per (GRP) point
VOD—Video on Demand
OLV—Online Video
MVPD (Multichannel Video Programming Distributor)
Xscreen or Cross-Screen—Campaigns that target multiple diverse screens: TV; Desktop; tablet; smartphone; etc.
HH—Household
Demo and Demo Targeting—Demographic Segment (Age and Gender)
Strategic Targeting—Targeting other than Demographic. Strategic targeting can include without limitation and for example any or all of: buying behavior; income; ethnicity; education; children; home; auto; and pets.
Media Property or just "Property"—Any screen type where an advertisement may appear
Daypart—Portions of a day where media may be viewed
Demand-Side Platform (DSP) An organization that performs an advertising agency function for advertisers/clients to plan and operate advertising campaigns on their behalf. A DSP (such as TubeMogul, Inc.) may develop and operate a proprietary system for planning and executing advertising campaigns, including profiling Viewers and Media Properties. Such as DSP operated system is also a source of data from previous advertising campaigns. Note that a DSP may represent client companies, or alternately be captive to a company or operate as a department within a company.
Fusion—A source of $3^{rd}$ party data (e.g., Nielsen) that merges multiple and diverse datasets of viewership information into a single database.
NPN—A source of $3^{rd}$ party data such as Nielsen's "National People Meter"
SSP—Supply Side Partner
DSP—Demand Side Platform
Sites—Websites
DT—Desktop
Linear TV—Conventional time-and-channel-based TV
KPI—Key Performance Indicator
Comscore—a $3^{rd}$ party provider of data regarding advertising campaigns
Nielsen—a $3^{rd}$ party provider of viewership data and related tools

BRIEF DESCRIPTION OF THE DRAWINGS

FIG. 9 shows an alternative functionality for guiding the split between TV ad spending and digital media ad spending.

DETAILED DESCRIPTION OF THE PREFERRED EMBODIMENTS

Systems and methods are disclosed for analyzing a fused sample of viewership data to determine a behavior profile of online viewers who watched and/or didn't watch certain TV advertisements, where the TV advertisements are aligned with campaign targeting characteristics desired by an advertiser/client working with a demand side platform. Then, a campaign targeting plan is developed for dividing an advertising budget between digital media and TV impressions. The digital media portion of the campaign profiles Media Properties (MPs) contained in a historical database from past digital advertising campaigns across multiple digital formats and screens, and aligns digital ad placement with MPs having desired targeting characteristics. An optimized apportionment is automatically produced between TV and digital media spending based on an advertiser/client's goals of duplicating or not duplicating viewership of an advertisement between TV and digital media, or alternately based on cost alone. Alternately, the apportionment can be guided interactively.

Figure 1:
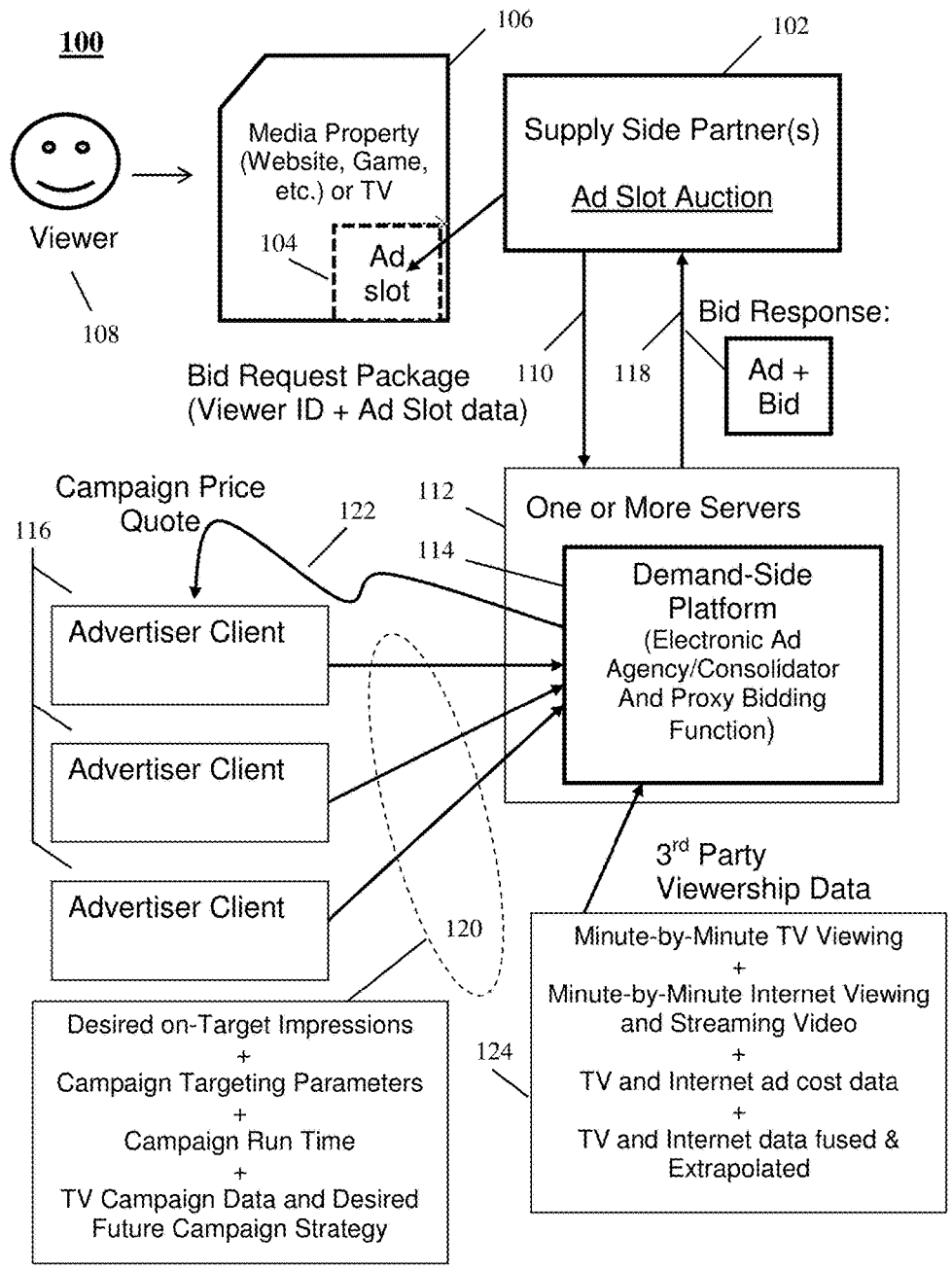
FIG. 1 shows an overview block diagram describing system components and data flow for a demand side platform according to the invention, with a focus on planning and executing a future cross format campaign.

FIG. 1 shows an overview block diagram describing system components and data flow for a demand side platform according to the invention, with a focus on planning and executing a future cross format campaign based on 3$^{rd}$ party TV and digital viewership information combined with historical digital media viewership information compiled over past campaigns by the demand side platform. In FIG. 1, the overview block diagram 100 for a system according to the invention includes a DSP (demand-side platform) 114 that interacts with advertiser/clients 116; supply side partners 102; and sources 124 of third party viewership data. The demand-side platform 114 utilizes automation software operating on one or more servers/processors 112 to bid for ad slots 104 to be shown to viewers 108 via media property or TV programming 106. Online advertising and/or TV programming supply side partner(s) 102 typically provide a sale opportunity or bid request package 110—typically including ad slot data—to the demand-side platform 114. The demand-side platform will, in turn and if appropriate, provide a response 118 to supply side partner 102, that response including a bid and either an advertisement or information describing an advertisement. The decision to bid, and how much to bid, is automatically calculated by software running on the one or more servers 112 where targeting and planning information 120 supplied by advertiser/client 116 is processed. Such information may include for example and without limitation: desired on-target impressions; campaign targeting parameters; campaign runtime; campaign budget; maximum bid; and TV campaign data and desired campaign strategy. During the campaign planning stage, the DSP provides campaign cost estimates 122 and estimates for results to advertiser/clients 116.

Figure 2:
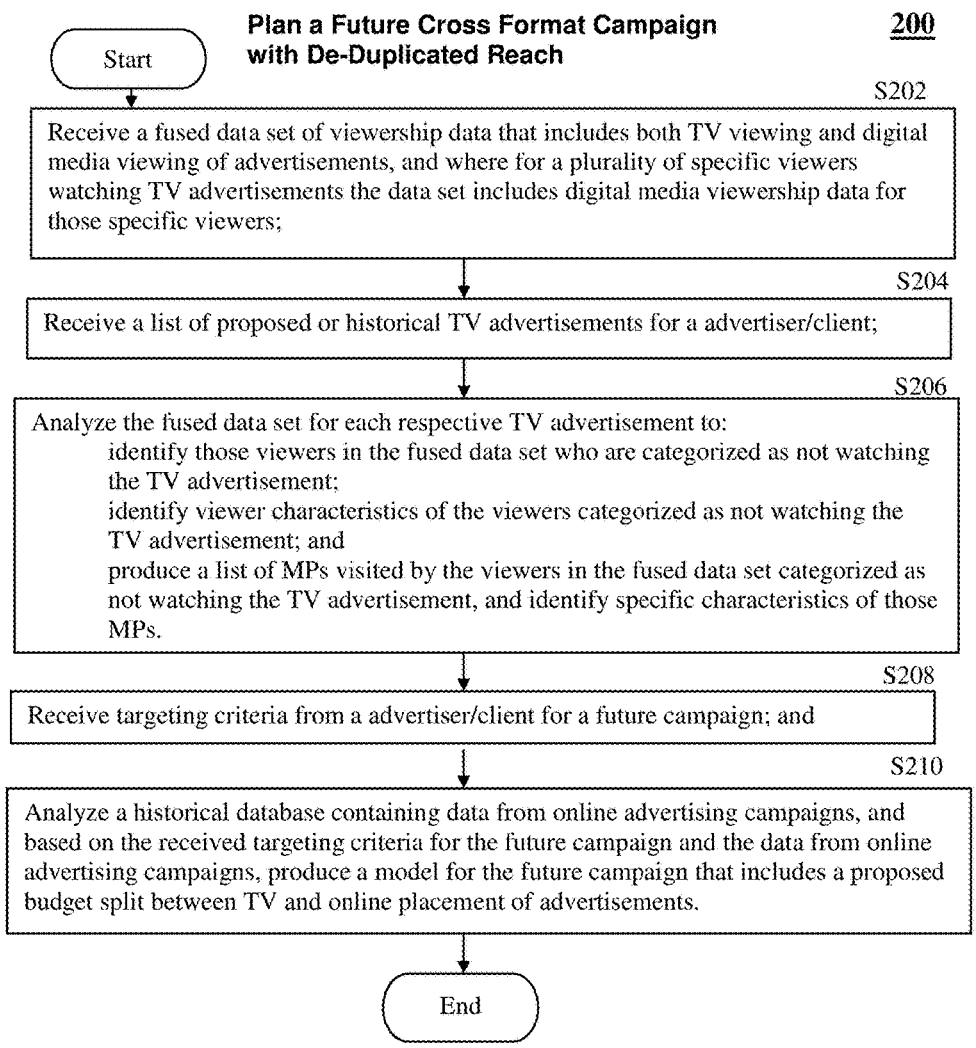
FIG. 2 shows a flow chart describing a process for planning a cross format campaign with emphasis on reaching unexposed TV viewers.

FIG. 2 shows a flow chart describing a process for planning a cross format campaign where an advertiser/client wishes to plan the campaign such that viewers who did not watch certain ads on TV get to see them on digital media, thereby increasing the reach of the campaign—the process referred to as optimization by de-duped reach. In step S202 a fused data set of viewership data is received that includes both TV viewing and digital media viewing of advertisements, and where for a plurality of specific viewers watching TV advertisements the data set includes digital media viewership data for those specific viewers. In step S204, a list of proposed or historical TV advertisements is received for a particular advertiser/client. In step S206, the fused data set is analyzed for each respective TV advertisement to:

(i) identify those viewers in the fused data set who are categorized as NOT WATCHING the TV advertisement;

(ii) identify viewer characteristics of the viewers categorized as NOT WATCHING the TV advertisement; and (iii) produce a list of MPs visited by the viewers in the fused data set categorized as NOT WATCHING the TV advertisement, and identify specific characteristics of those MPs;

In step S208, targeting criteria from an advertiser/client is received for a future campaign. In step S210, a historical database containing data from online advertising campaigns is analyzed, and based on the received targeting criteria for the future campaign and the data from online advertising campaigns, a model for the future campaign is produced that includes a proposed budget split between TV and online placement of advertisements.

Figure 3:
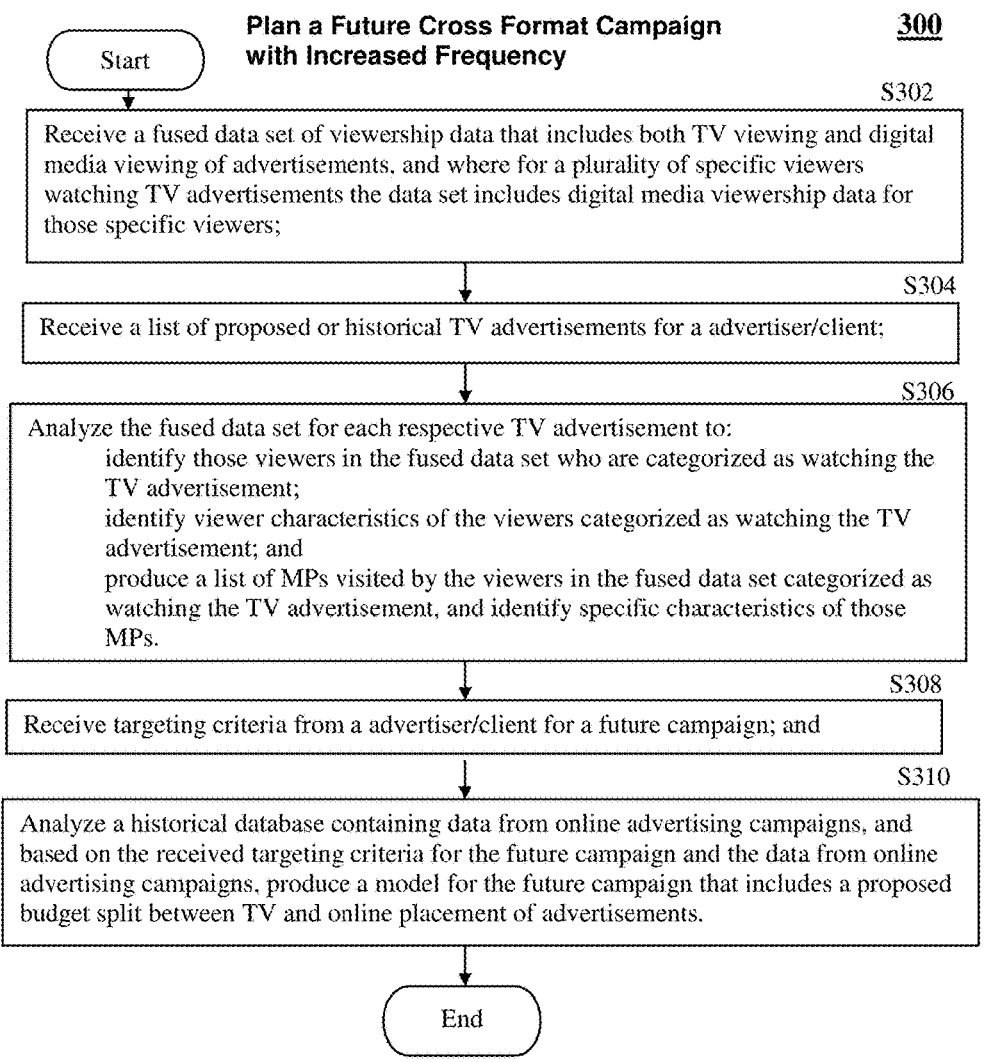
FIG. 3 shows a flow chart describing a process for planning a cross format campaign with emphasis on reinforcing viewership.

FIG. 3 shows a flow chart describing a process for planning a cross format campaign where an advertiser/client wishes to plan a campaign such that the viewing of certain ads on TV is reinforced by targeting the same viewers on digital media in order to increase the frequency of viewership of those ads—the process referred to as optimization by increased frequency. In step S302, a fused data set of viewership data is received that includes both TV viewing and digital media viewing of advertisements, and where for a plurality of specific viewers watching TV advertisements the data set includes digital media viewership data for those specific viewers. In step S304, a list of proposed or historical TV advertisements is received for an advertiser/client. In step 306, the fused data set is analyzed for each respective TV advertisement to:

(i) identify those viewers in the fused data set who are categorized as WATCHING the TV advertisement;

(ii) identify viewer characteristics of the viewers categorized as WATCHING the TV advertisement; and (iii) produce a list of MPs visited by the viewers in the fused data set categorized as WATCHING the TV advertisement, and identify specific characteristics of those MPs;

In step S308, targeting criteria is received from an advertiser/client for a future campaign. In step S310, a historical database containing data from online advertising campaigns is analyzed, and based on the received targeting criteria for the future campaign and the data from online advertising campaigns, a model for the future campaign is produced that includes a proposed budget split between TV and online placement of advertisements.

Figure 4:
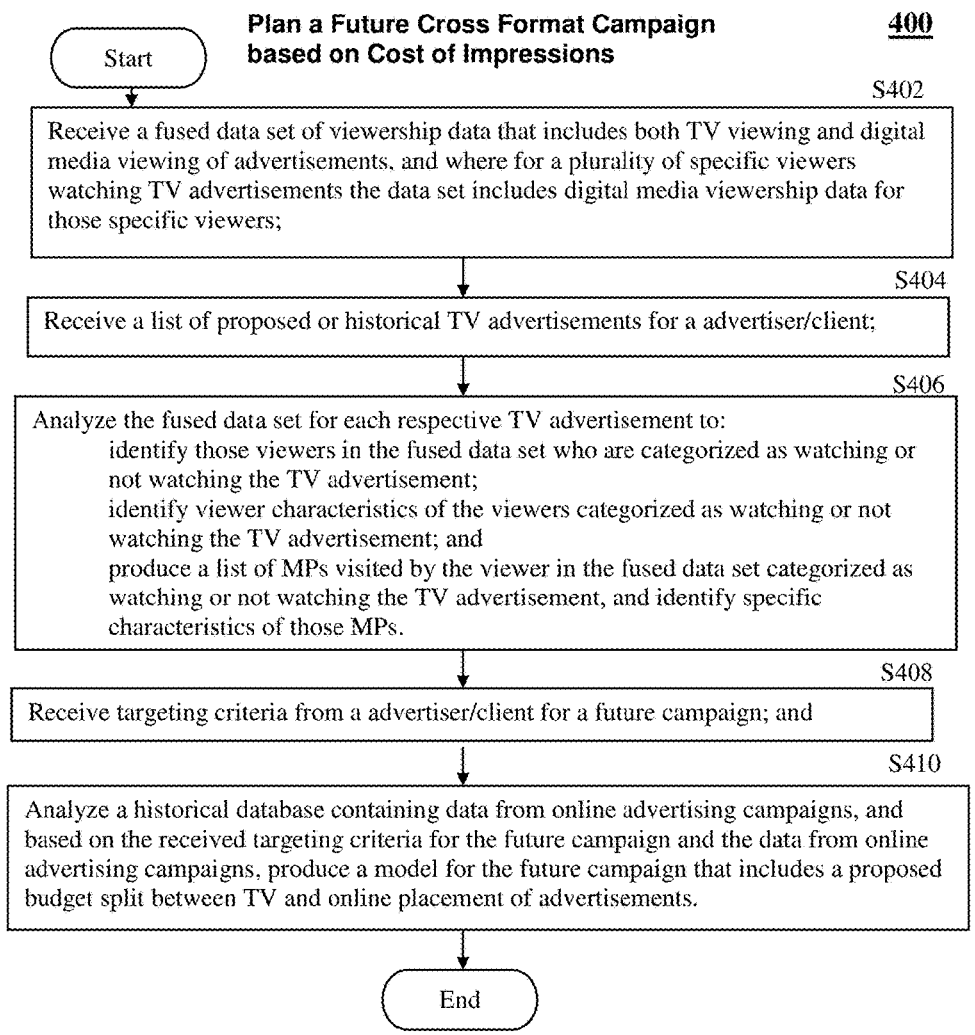
FIG. 4 shows a flow chart describing a process for planning a cross format campaign with emphasis on achieving the lowest cost per impression.

FIG. 4 shows a flow chart describing a process for planning a cross format campaign where an advertiser/client wishes to plan a campaign such that the lowest cost per impression is achieved without regard to whether or not a TV viewer sees the same ad on digital media—the process referred to as optimization by "cheapest to reach". In step 402, a fused data set of viewership data is received that includes both TV viewing and digital media viewing of advertisements, and where for a plurality of specific viewers watching TV advertisements the data set includes digital media viewership data for those specific viewers. In step 404, a list of proposed or historical TV advertisements is received for an advertiser/client. In step 406, the fused data set is analyzed for each respective TV advertisement to:

(i) identify those viewers in the fused data set who are categorized as WATCHING OR NOT WATCHING the TV advertisement;

(ii) identify viewer characteristics of the viewers categorized as WATCHING OR NOT WATCHING the TV advertisement; and (iii) produce a list of MPs visited by the viewer in the fused data set categorized as WATCHING OR NOT WATCHING the TV advertisement, and identify specific characteristics of those MPs.

In step 408, targeting criteria is received from an advertiser/client for a future campaign. In step S410, a historical database containing data from online advertising campaigns is analyzed, and based on the received targeting criteria for the future campaign and the data from online advertising campaigns, a model for the future campaign is produced that includes a proposed budget split between TV and online placement of advertisements.

For the processes of FIGS. 2, 3, and 4, the campaign model includes target lists for both TV demographics and MPs targeted for digital media. The lists are combined and sorted to produce an overall target list for a campaign. The combined list can be then sorted by cost efficiency (cost per on-target impression) to produce a prioritized targeting list for the future campaign.

Note that TV viewership information used in the process may be related to past advertising campaigns for TV or may alternately be projected TV viewership information. Characteristics of MPs may include without limitation one or more of demographic information; the cost of purchasing impressions on the MP; a historical "reach" for the MP which reflects how frequently impression opportunities arise for that MP. Note that ad campaigns usually have a specified run time, and if a particular MP has a very small reach it may contribute little value to a campaign if impression opportunities for that MP appear infrequently.

Optimization for a campaign targeting both TV and digital media can be performed for cost and/or for reach, including optimization for CPMs (Cost per 1,000 on-target impressions) and/or GRPs (Gross Rating Points).

A campaign planner at an advertiser/client needs the latest data to be included in a cross format planning tool so that they can be confident in the results of the tool, by recognizing that the data from their historical TV buy is correct. This is accomplished by:

building a historical record of the previous year's data using the planning tool by month, quarter, or year handling updates from a $3^{rd}$ party (e.g., Nielsen) when they correct data identifying when there are gaps in the datasets, indicating where for some reason all the data is not available acquiring datasets from a $3^{rd}$ party that tracks viewership equivalent to the following datasets available from Nielsen:

National People Meter;

Netview & VideoCensus;

Fusion; and

Monitor Plus

Note that $3^{rd}$ party viewership data suppliers may supply data indicative of a viewer panel and/or actual viewership data acquired by monitoring a large number of viewers over time. The most prominent supplier of viewership data today in the United States is Nielsen, however other sources of viewership data exist, and without limitation such other sources may include for example Barb in the UK, OZTam in Australia, and Rentrak in the US. The embodiments described herein do not rely on any specific supplier of viewership data, and any specific mention of data packages supplied by, for example Nielsen, are only exemplary.

Figure 5:
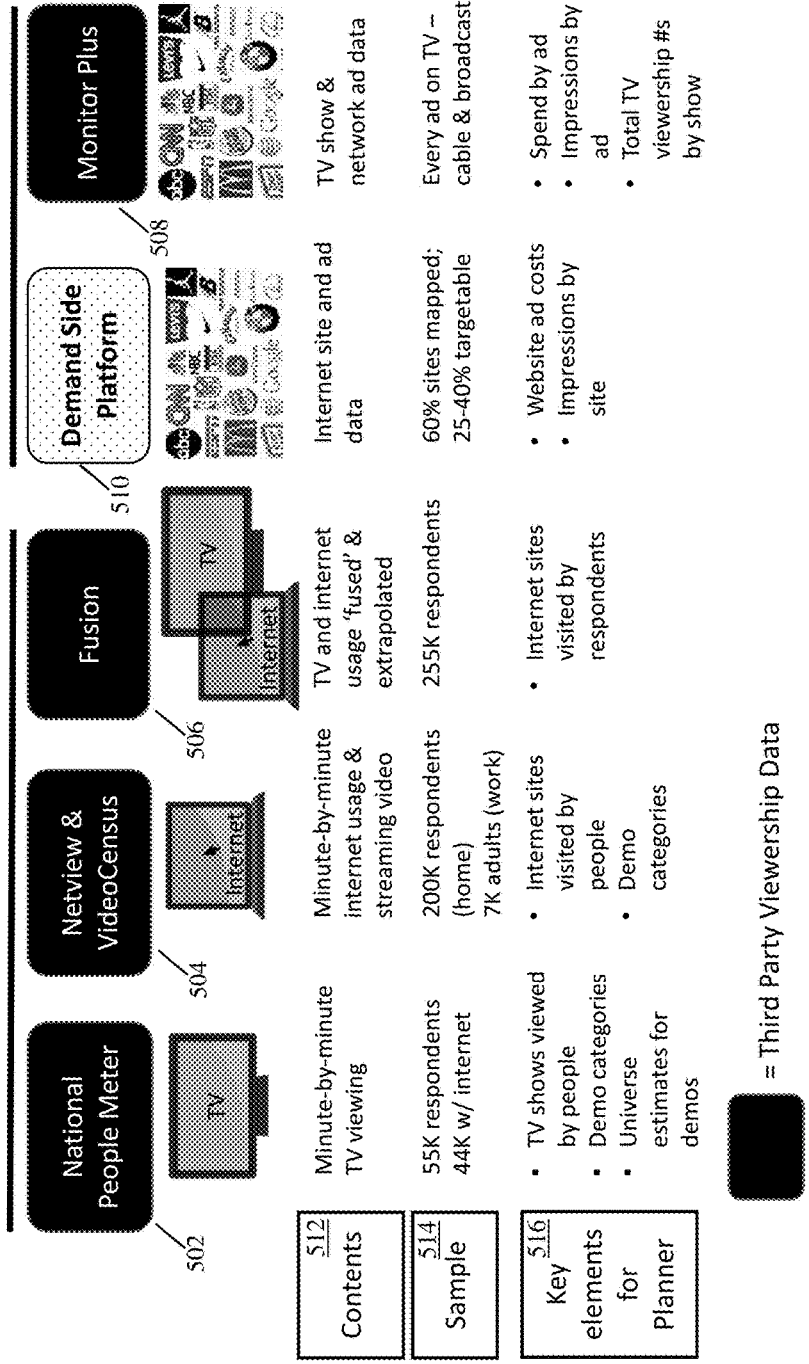
FIG. 5 shows a matrix defining different data sets used for cross format advertising campaign planning.

FIG. 5 shows a matrix defining different data sets used for cross format advertising campaign planning. Four data sets 502-508 of the five total data sets are examples of those available from third-party viewership data suppliers such as, for example, Nielsen. As shown in FIG. 5, the National People Meter 502 shows minute by minute TV viewing and when supplied by Nielsen contains for example 55,000 respondents—the majority of whom have Internet access and recording devices for Internet activity. The data set entitled NetView & VideoCensus 504 when supplied by Nielsen contains for example 200,000 respondents with Internet activity tracking. The Fusion data set 506 contains approximately 255,000 respondents where TV and Internet usage is fused and extrapolated. The data set entitled Monitor plus 508, when supplied by Nielsen, shows TV activity with related cost data. Data set 510, supplied by a demand-side platform, provides Internet site (MP) data and related advertising data. For each supplied data set, descriptions for Contents 512, Sample Size 514, and Key Elements for the Planner 516 are shown.

Figure 6:
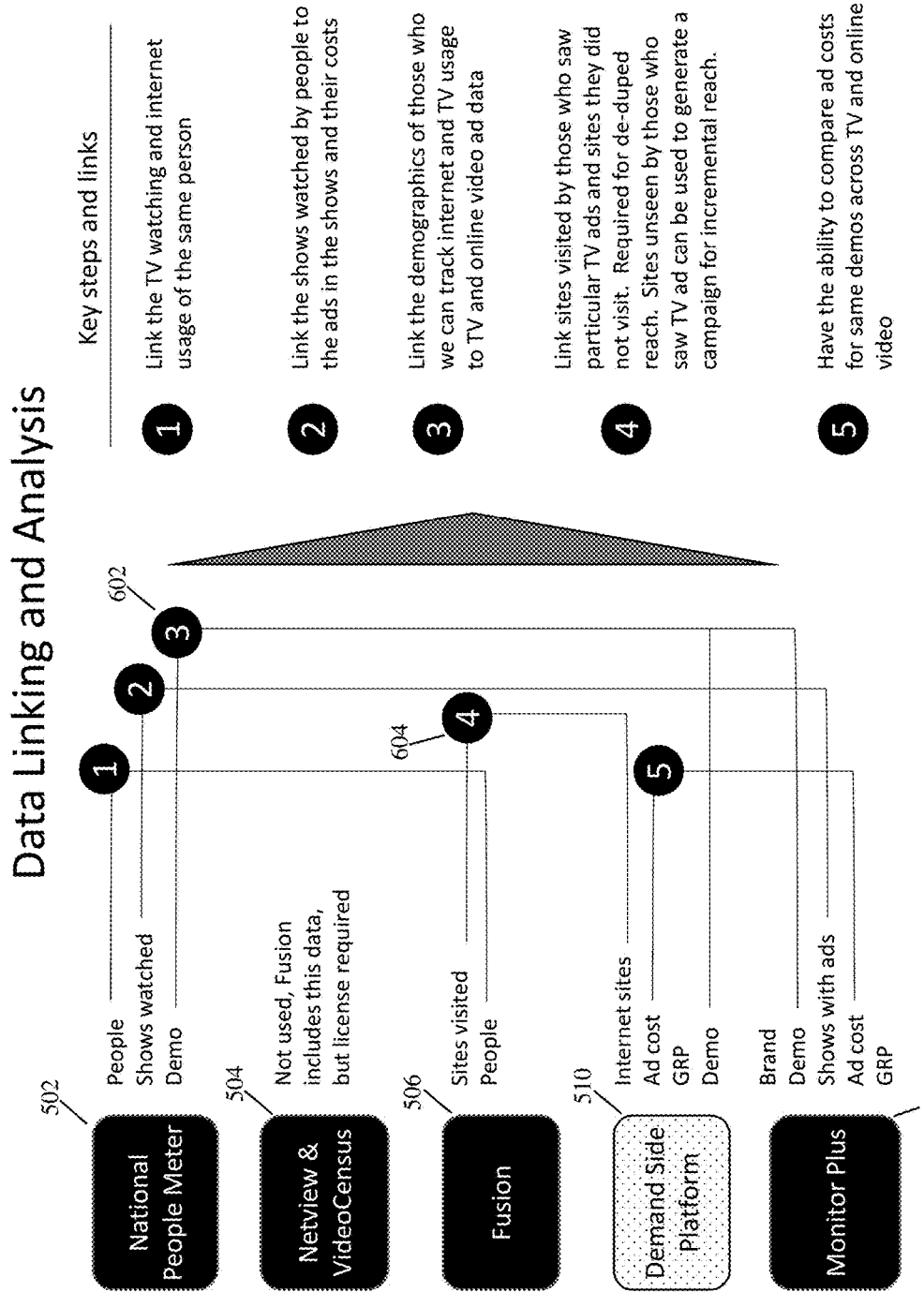
FIG. 6 shows how the various data sets of FIG. 5 are linked and analyzed in creating a cross format advertising campaign.

FIG. 6 shows how the various data sets of FIG. 5 are linked and analyzed in creating a cross format advertising campaign. Note in particular for linkage number "3" 602 that demographic characteristics of those viewers tracked for Internet and TV usage are linked to TV and online video ad data. For linkage number "4" 604 in FIG. 6, sites (MPs) visited by viewers who saw particular TV ads are linked with sites they did NOT visit. This linkage is required for de-duped (un-duplicated) reach. Sites (MPs) unseen by those who saw a TV ad can be used by the DSP to generate a cross format campaign for incremental reach as described herein.

Figure 7:
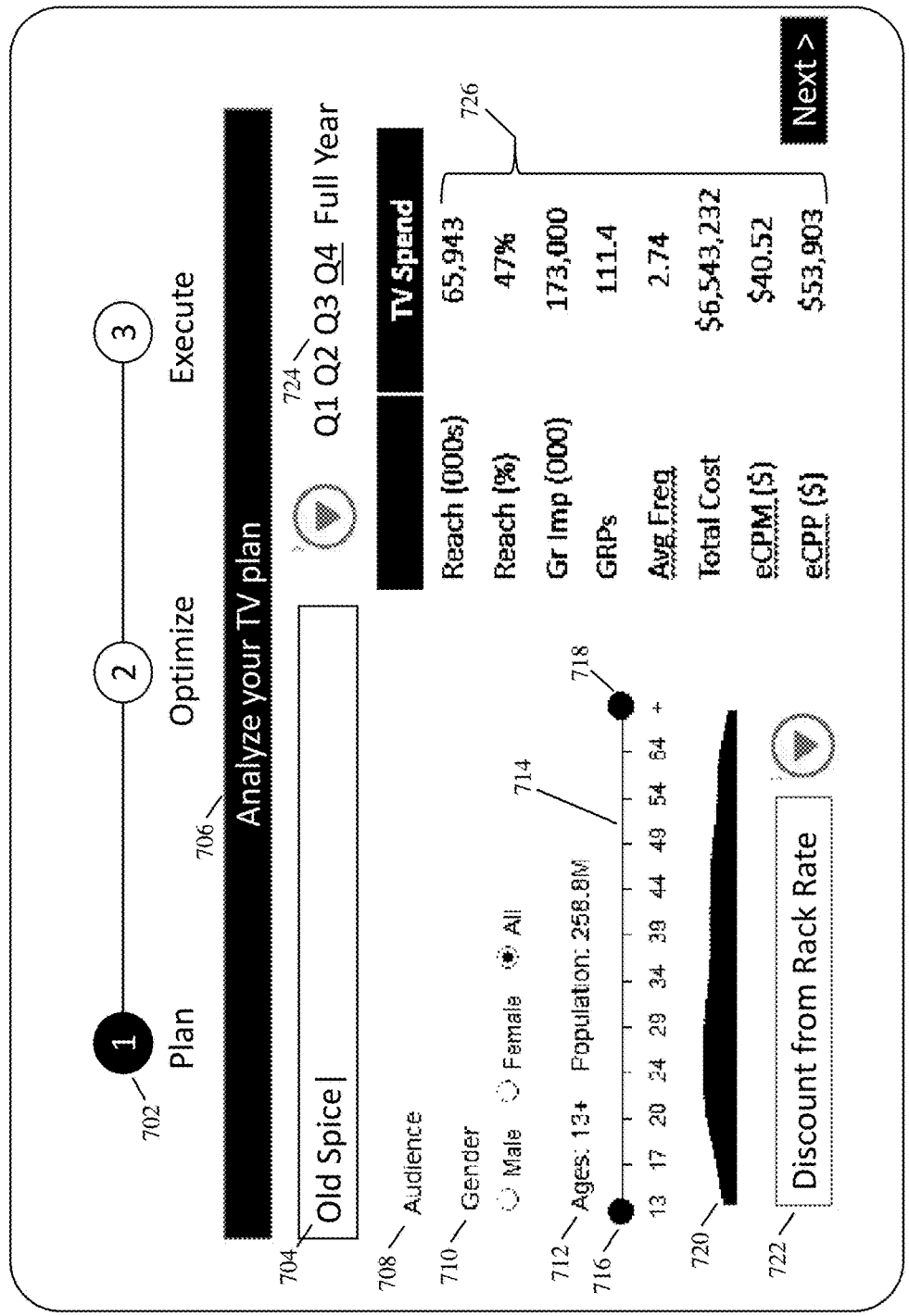
FIG. 7 shows one exemplary user interface for the planning stage of a cross format campaign.

FIG. 7 shows one exemplary user interface for the planning stage 702 of a cross format campaign, where an advertiser/client's current plan 704 for TV advertising is analyzed 706 to provide a baseline. The audience 708 for the plan is entered, including Gender 710, which can be Male, Female or All genders. The targeted age bracket 712 for the TV plan is entered by independently positioning slider nodes 716 and 718 on horizontal age bracketing tool 714 to visually bracket the targeted ages. A functionality of the user interface of FIG. 7 includes a histogram graph showing a viewer population distribution 720 that appears under horizontal age bracketing tool 714, and can be optionally truncated at either or both ends as either or both of slider nodes 716 and 718 are moved to indicate the age distribution within the specifically bracketed ages. Also, as either or both of slider nodes 716 and 718 are moved, the targeted (bracketed) population 712 is automatically updated. At the bottom left, a Discount from Rack Rate 722 can be entered. Timeframe 724 to be analyzed for the plan is entered and a summary of results 726 is automatically presented to the planner. The exemplary and non-limiting summary of FIG.

7, includes: Reach; Reach (%); gross impressions; GRPs; average frequency; total cost; eCPM; and eCPP.

Figure 8:
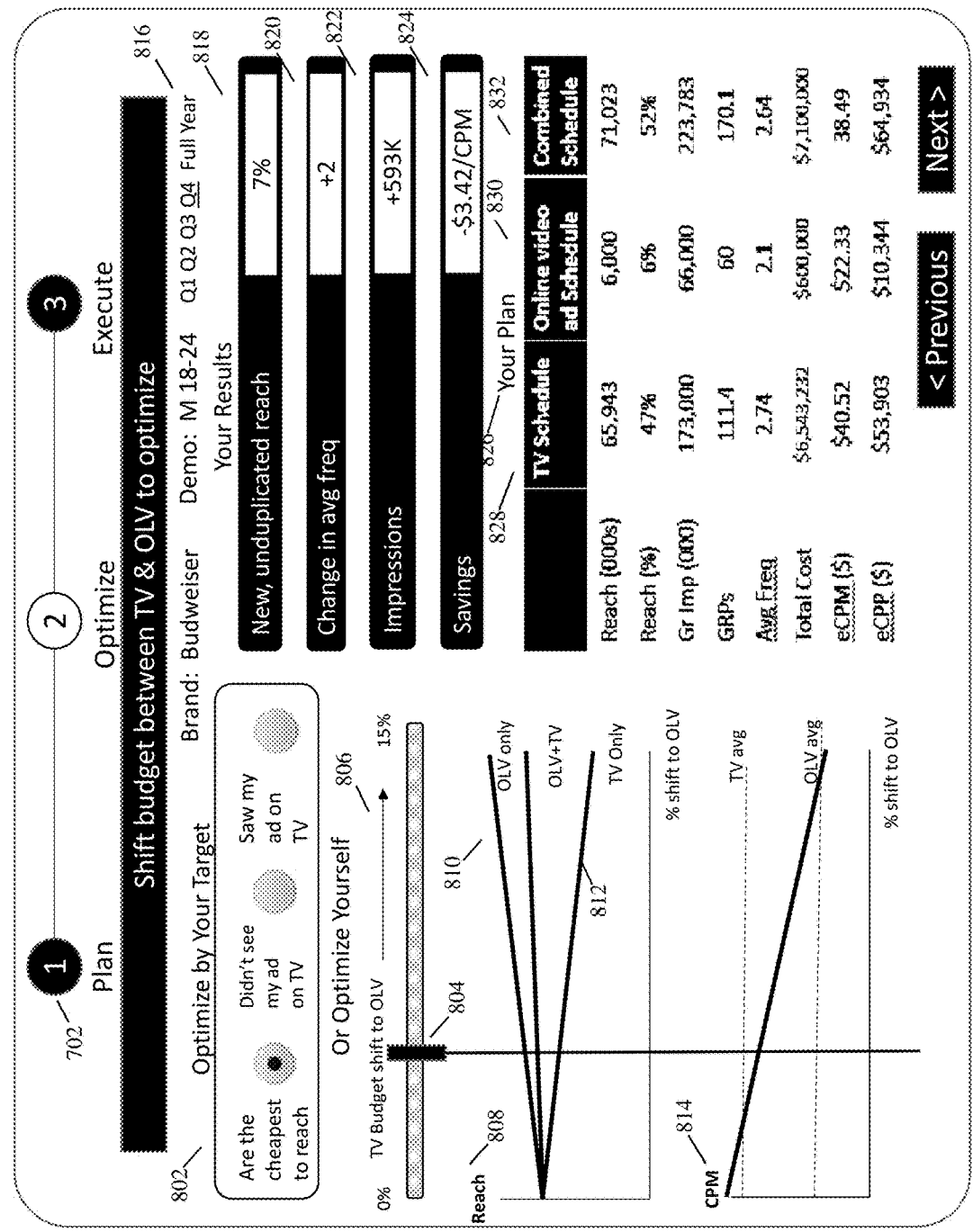
FIG. 8 shows an exemplary user interface for the planning stage of a cross format campaign where a planner may observe the effect of shifting portions of their TV advertising budget to digital media.

FIG. 8 shows an exemplary user interface for the planning stage of a cross format campaign where a planner on behalf of a client advertiser may observe the effect of shifting portions of their TV advertising budget to digital media, in this figure referred to as online video ads or (OLV). Here, in the box 802 at the upper left, the planner Optimizes by Target by choosing from three basic strategies for the cross format campaign that can be automatically calculated according to the invention based on the data sets supplied:

(i) "Are the cheapest to reach"—where the campaign combines TV and digital media without concern for whether or not digital media viewers in the fused data set saw or did not see ads on TV;

(ii) "Didn't see my ad on TV"—where the strategy is focused on de-duplication in order to increase the reach of the combined campaign; and (iii) "Saw my ad on TV"—where the strategy is focused on reinforcing TV viewership with online impressions in order to increase the frequency of the combined campaign.

Alternately, a planner can manually optimize the campaign by manipulating a slider bar 804 located at the left side of the display shown in FIG. 8. The position of the bar affects both the reach and cost of the campaign, and as the slider bar is manipulated the resultant parameters shown on the right side of the screen in FIG. 8 are automatically calculated and change accordingly to display the calculated parameters. As slider bar 804 is moved horizontally, a choice is automatically made for reach 808 with respect to proportions of OLV 810 versus TV Only 812. Also with respect to impressions, a choice for CPM 814 is automatically made with respect to a percentage shift towards OLV.

On the right-hand side of the user interface display of FIG. 8, parameters 816 guide the plan for this advertising placement that was set in other screens are shown and include the brand; the demographic age/gender parameters; and the timeframe. As key parameters on the left hand side of FIG. 8 with respect to shifting between TV and OLV are changed by a planner utilizing this user interface, results are automatically updated by underlying processes according to embodiments of the invention. For instance, a new percentage for unduplicated reach 818 is displayed as well as a change in average frequency 820. Estimated numbers of impressions 822 are updated along with financial savings 824 resulting from the plan. Finally, at the bottom right of FIG. 8 is a summary 826 for the plan, including parameters 726 that were shown with respect to FIG. 7. For FIG. 8 however, these projected results are shown separately with respect to a TV Schedule 828; and Online Video Ad Schedule 830; and a Combined Schedule 832.

Figure 9:
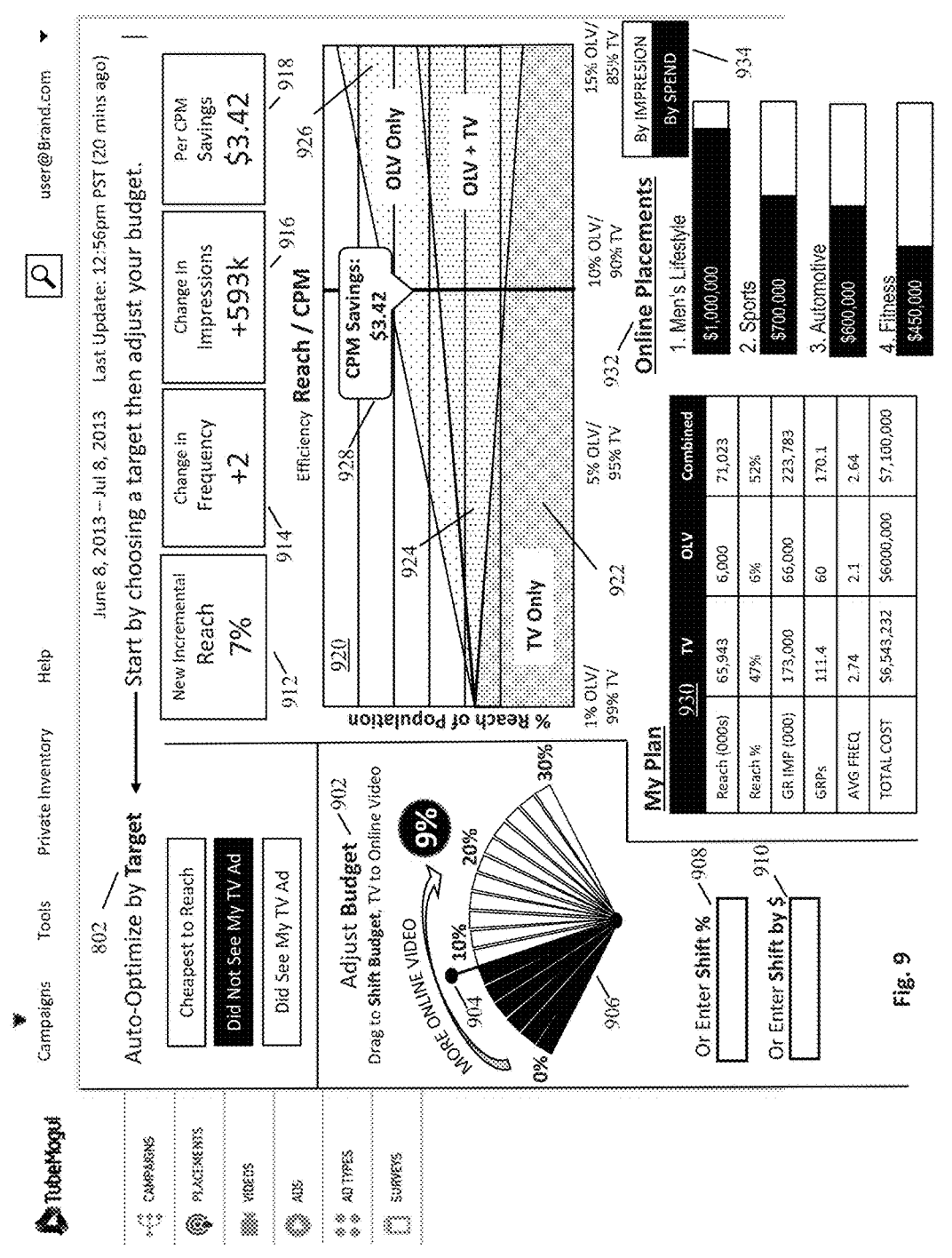

FIG. 9 shows an alternative functionality for guiding the split between TV ad spending and digital media ad spending. Similar to FIG. 8, but with a different graphical appearance, choices for automatic optimization by target 802 is shown in the upper left corner of the user interface display of FIG. 9. Similar to FIG. 8, the basic strategy is chosen by the planner to be one of "cheapest to reach"; "did not see my TV ad"; and "did see my TV ad". Below targeting choice 802, a radial dial mechanism for budget adjustment 902 is presented at the left whereby the planner can choose the percentages for the split between TV and Online Video. A unique fan shaped graphical input mechanism 906 is presented to the planner where by dragging node 904 left or right around the arc of fan 906, a budget shift can be defined between TV and Online Video. Alternately, a shift percentage 908 may be entered, or a dollar amount 910 can be entered to define the shift.

As fan dial 906 is rotated, resultant projected parameters are automatically calculated and displayed at the right along with example online placements. At the top right of the display, prominent boxes are shown with parameter changes to help guide the planner including: a New Incremental Reach 912; a Change in Frequency 914; a Change in Impressions 916; and Per CPM Savings 918. At the center-right of the display is a graph 920 showing a percentage reached of the population with respect to the percentage split between OLV and TV. Specific graphs for TV-Only 922, OLV+TV 924, and OLV-Only 926 are shown along with an overall CPM savings 928.

At the bottom of the user interface display of FIG. 9 is a result summary 930, which is similar to summary 826 of FIG. 8, and also a summary 932 of online placements characterized by viewer interest area—including for example and without limitation: men's lifestyle; sports; automotive; and fitness. Included for each of these viewer interest areas is either a projected cost as shown in the display example, or alternately projected impressions. Which of cost or impressions are shown for the placement breakdown at the lower right of FIG. 9 is controlled by selector 934.

Figure 10:
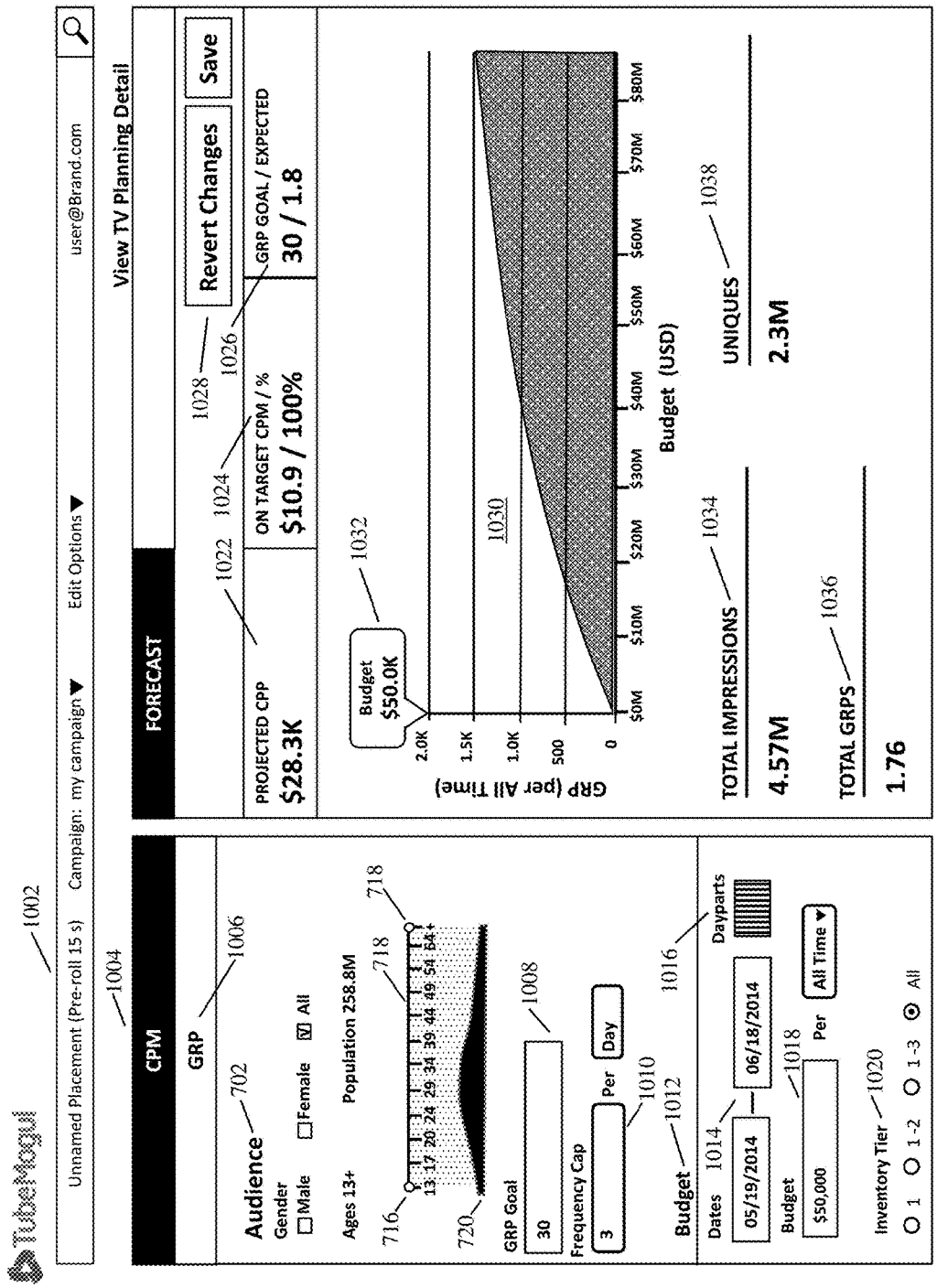
FIG. 10 shows the user interface for a planning tool according to the invention which allows planners to adjust their campaign and observe projected results in terms of on-target impressions, GRPs, and cost.

FIG. 10 shows the user interface for a planning tool which allows planners to adjust their campaign and observe automatically projected results in terms of on-target impressions, GRPs, and cost. This tool was previously shown and described in co-pending U.S. Patent Application Publication No. 2014-0278912 entitled: "Systems and Methods for Predicting and Pricing of Gross Rating Point scores by Modeling Viewer Data". When used in conjunction with cross format planning tools such as those shown in FIGS. 7, 8, and 9, the user interface shown in FIG. 10 now incorporates data and planning for a cross format campaign targeting both TV advertising and digital media advertising.

At the top of the exemplary user interface display of FIG. 10 is an information bar 1002 that contains: the name of the placement; a mechanism for choosing the campaign and editing options; the particular planner's email address; and a search tool. At the top left side are selectors for planning according to CPM 1004 or GRP 1006. Under these selectors is an audience targeting mechanism similar to that previously shown in FIG. 7, and includes selection 702 for age and gender, and in particular includes horizontal selector bar 718 with individually positioned slider nodes 716 and 718 that are manipulated by the planner to bracket the lower and upper bounds respectively of the targeted age bracket. As with FIG. 7, a graphical histogram 720 of the age distribution bracketed by selector bar 718 is also shown. Placement parameters are entered here such as for example and without limitation a GRP goal 1008 that may be entered as well as a Frequency Cap 1010. At the bottom left of the user interface display of FIG. 10 are additional placement parameters such as budgeting controls 1012, including dates 1014 and a budget 1018. A planner may further select particular dayparts to address by clicking the daypart selector 1016 which brings up a user interface facility for daypart selection. An inventory tier 1020 to be utilized is chosen at the bottom left. A planner may choose one or more classifications or segmentations of MPs to be addressed by a campaign, herein labeled "Inventory Tiers" 1020. For this non-limiting example, available classifications include tiers ranging from MPs that are very well-recognized to those that are less recognizable. For example, Tier 1 can represent sites a user's friends and family would recognize. Tier 2 can represent MPs with lower brand recognition or awareness. Tier 3 can represent brand-safe sites that are niche or reach. "Brand safe" refers to MPs where there is nothing controversial such as guns, sex, violence, or alcohol, etc. "Niche" means there is a smaller audience, such as for instance a site for vegan cooks. "Reach" sites are MPs with huge audiences and many demographics such as YouTube, CBS, etc. Reach sites provide broad exposure, however with little specific brand alignment.

On the right-hand side of the user interface display of FIG. 10 are forecasted results including at the top projected CPP 1022; projected On Target CPM and % 1024; and a GRP Goal and Expected value 1026. A mechanism is also included to Revert Changes 1028. A graph 1030 of projected GRP results is shown with respect to budget, and an annunciator 1032 is shown positioned on the graph in response to a value entered as budget 1018. Projected total impressions 1034 are shown at the bottom right along with projected total GRPs 1036 and projected Uniques 1038.

Figure 11:
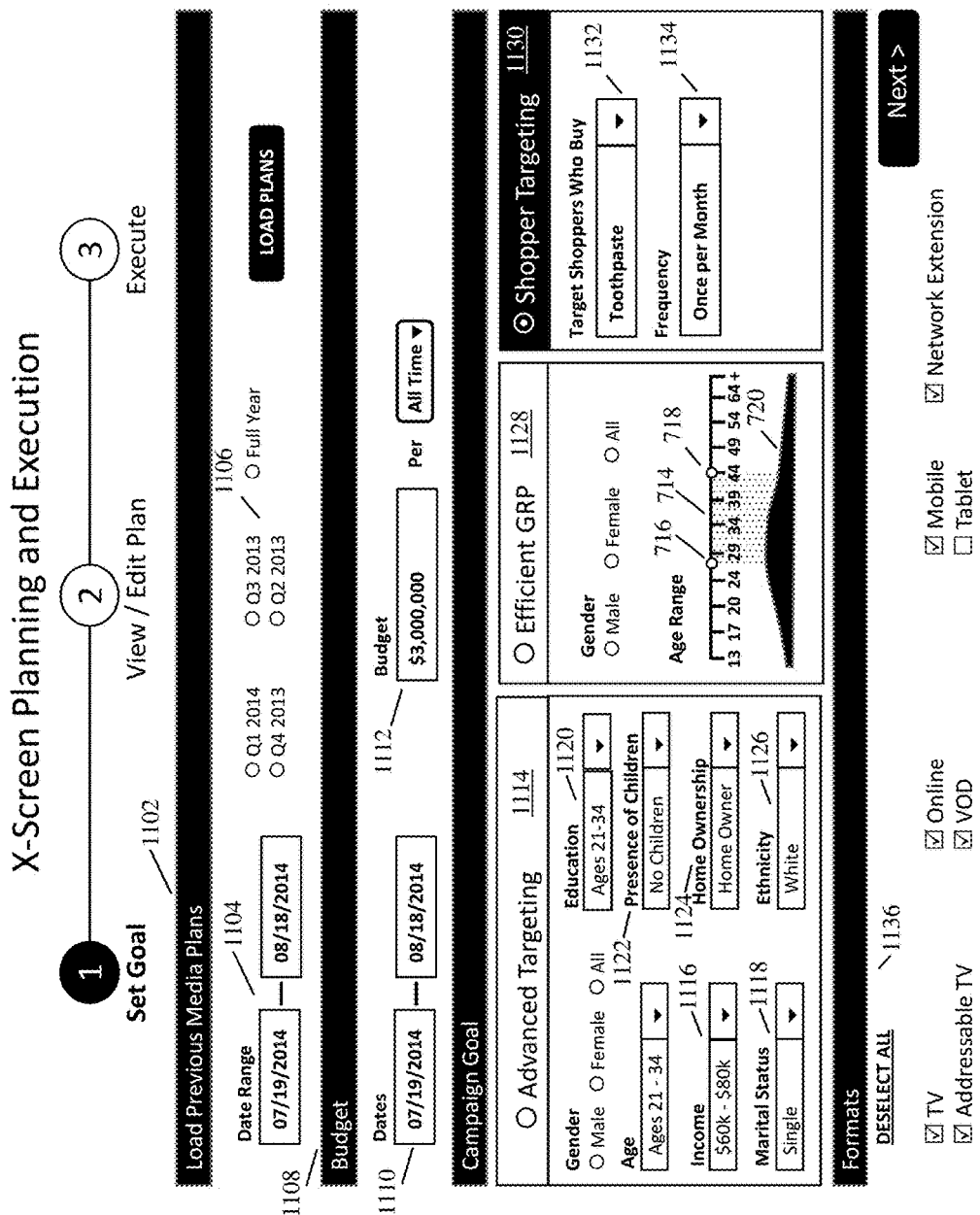
FIG. 11 shows a planning tool for a cross format platform focused on GRP or CPM results and including advanced (strategic) targeting choices.

FIG. 11 shows a planning tool for a cross format platform focused on GRP or CPM results and including advanced/strategic targeting choices that go beyond simple age and gender to include viewer characteristics such as for example and without limitation: income; marital status; education; presence of children; homeownership; and ethnicity. Also included are exemplary choices for advanced targeting of buyer behavior—which could be either modeled or actual behavior—in this instance targeting a specific product or service that a shopper might buy and also targeting a frequency for their purchase of that product or service. Also included are choices of different target screen formats for display platforms including platform variations for both TV and digital media, ensuring that planners using the tool per FIG. 11 have the ability to optimize for de-duplication or reach across all formats and screen types.

At the top of FIG. 11, a facility 1102 for loading previous media plans is provided and includes a date range 1104 and a timeframe specification 1106 that provides for specification of quarters or a full year. Below that, a facility for budget entry 1108 is provided for planning a new campaign with a specified date range 1110 and budget 1112. Next, campaign goals are specified that include advanced/strategic targeting 1114; age bracket targeting 1128; and shopper targeting 1130. Advanced/strategic targeting 1114 includes a targeting for: income 1116; marital status 1118; education 1120; presence of children 1122; home ownership 1124; and ethnicity 1126. Age bracket targeting 1128 utilizes a horizontal age bracketing tool 714 as previously shown in FIG. 7, with independently positioned slider nodes 716 and 718 to visually bracket the targeted ages. Age bracketing tool 714 is linked with histogram graph 720 showing a viewer population distribution that appears under horizontal age bracketing tool 714, and can be optionally truncated at either or both ends as either or both of slider nodes 716 and 718 are moved. Shopper targeting 1130 shows for this example targeting shoppers who buy toothpaste 1132, however this is exemplary and drop-down arrows allow editing to target a wide variety of products and services. Frequency 1134 for a viewer's purchase of a product or service can also be targeted. At the bottom of the user interface display of FIG. 11 is the ability to select different cross screen formats 1136 for targeting. An exemplary list of screen types shown for targeting includes without limitation: TV; Addressable TV; Online video; VOD; Mobile; Tablet; and Network extension.

Figure 12:
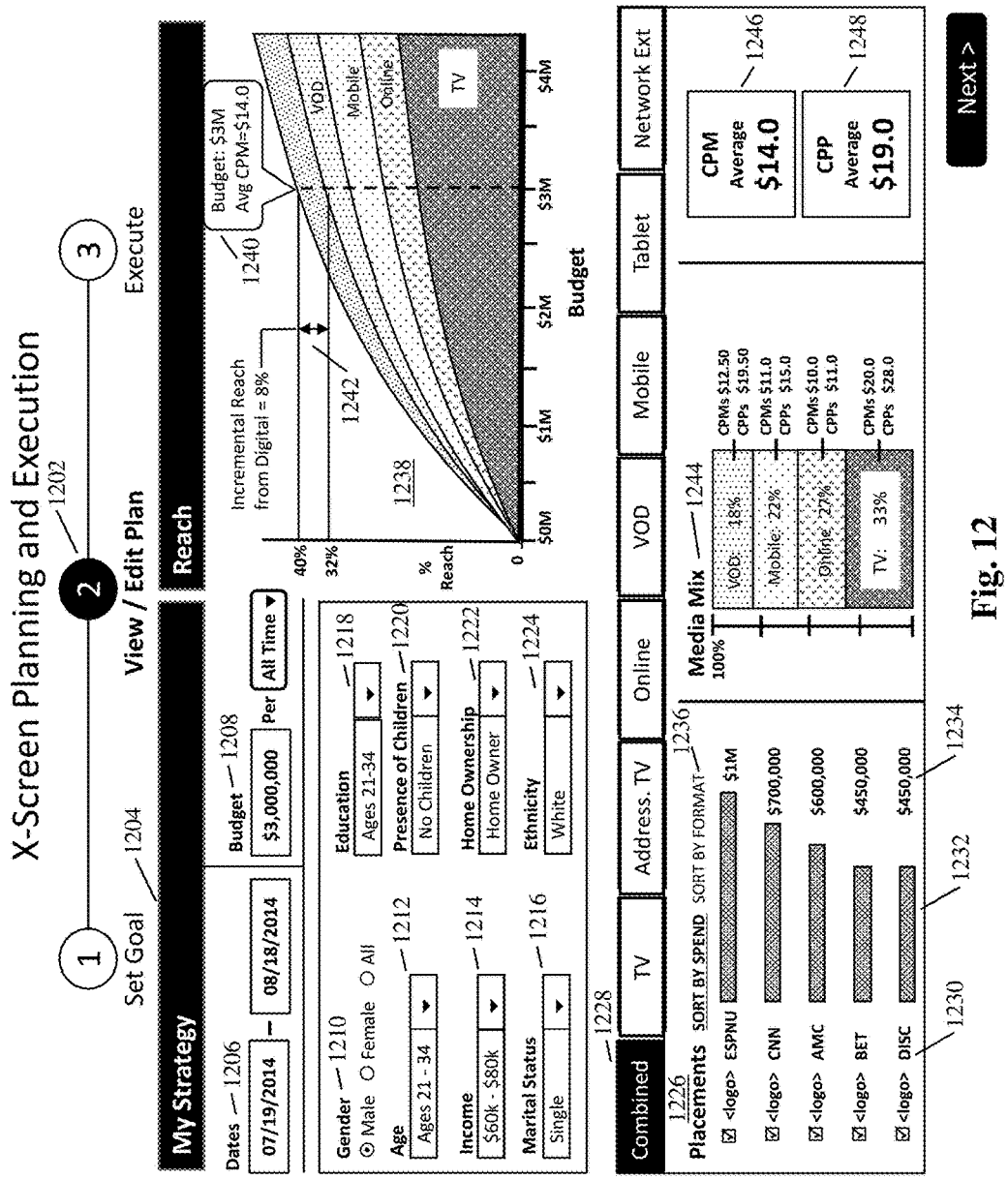
FIG. 12 shows an additional planning tool for a cross format campaign including a graph indicating incremental reach.

FIG. 12 shows an exemplary user interface for an additional planning tool for a cross format campaign, where a planner may view/edit 1202 a plan. An editable strategy summary 1204 is shown in the upper left, including date range 1206, budget 1208, and targeting criteria similar to those shown in FIG. 11, including gender targeting 1210 and age bracket targeting 1128, plus advanced/strategic targeting including for example and without limitation: income 1214; marital status 1216; education 1218; presence of children 1220; home ownership 1222; and ethnicity 1224.

At the top right of the user interface display of FIG. 12 is a graph 1238 showing % Reach with respect to Budget, and with the results broken down with separate subgraphs for different display platform types including: TV; online; mobile; and VOD. The Incremental Reach from Digital 1242 has been automatically calculated and is specifically shown at the point on the graph corresponding to the specified budget amount. An annunciator balloon 1240 is shown aligned with the specified budget number on the horizontal axis of the graph, and includes within annunciator balloon 1240 a display of the specified budget number and the average CPM.

A prioritized list of placement targets 1226 is shown at the lower left that resulted from the process shown in FIG. 2 for a campaign where the overriding strategy is incremental reach via non-duplication between TV and digital media. Here a "Combined" list 1228 is shown, however the list can be shown specifically focused on any of the following formats by selecting the appropriate tab: TV; Addressable TV; Online video; VOD; Mobile; Tablet; and Network extension. The displayed placement list 1228 can be sorted by spend or sorted by format 1236. Network names are displayed 1230 with logo and editable checkboxes for inclusion/exclusion. Horizontal bar graphs 1232 are included to visually indicate relative spending, and forecasted dollar spend 1234 is additionally shown. At the bottom center of the user interface display, a graph 1244 of relative media format mix is shown with horizontal bars for each format type including a percentage for each format as well as CPMs and CPPs. To the right of the media mix graph 1244 are prominent boxes indicating average CPM 1246 and average CPP 1248.

Figure 13:
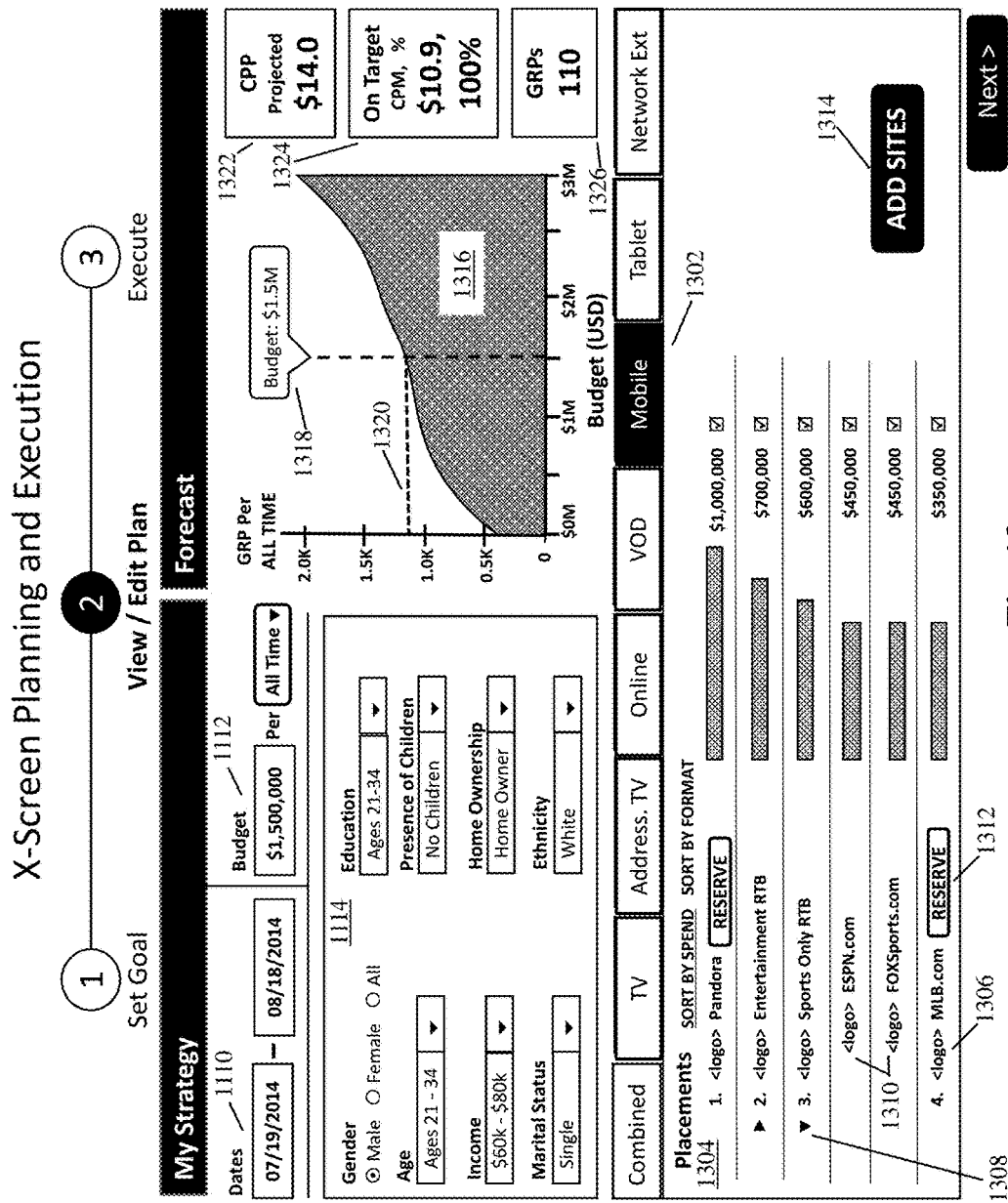
FIG. 13 shows an additional planning tool for a cross format campaign where results are shown in terms of CPP (cost per GRP point) and cost for on target impressions.

FIG. 13 shows an additional planning tool for a cross format campaign. Here, the results are shown in terms of CPP (cost per GRP point) and cost for on target impressions. Also shown are prioritized lists of placement targets, where a different prioritized list has been established for each of a plurality of display platform types. At the upper left of the user interface screen of FIG. 13 is a strategy summary for a cross format plan that was previously shown as part of the user interface of FIG. 11. Date range 1110 and budget 1112 are shown along with a targeting summary 1114 including conventional age/gender demographic targeting as well as advanced/strategic targeting for: income; marital status; education; presence of children; homeownership; and ethnicity. At the top right of the user interface display of FIG. 13 is a graph 1316 showing GRPs versus budget with a specified budget 1320 indicated by a horizontal dotted line, and annunciator balloon 1318 shown vertically above the specified budget location on the horizontal axis, where the annunciator balloon additionally indicates the budget number. At the right of graph 1316 are prominent boxes displaying: CPP 1322; On target CPM and % 1324; and GRPs 1326.

At the bottom of the user-interface display of FIG. 13 is a placement summary 1304 similar to summary 1226 of FIG. 12, however here the tab for Mobile 1302 has been selected, and therefore placements 1304 shown below indicate placement specifically planned for viewing on mobile devices. For each entry, a logo 1306 is typically displayed next to a network name, and for networks where reservations are appropriate or required for placement a button marked "Reserve" 1312 is shown. Note that some network categories such as 1308 have subnetworks 1310 where placements may be individually planned, and an arrow icon at the left of the network name allows expansion below to reveal available subnetworks 1310, in this example ESPN.com and FOXSports.com. Most of the parameters shown on the user interface of FIG. 13 that guide placements for an advertising campaign are editable, and in addition to editing individual fields, sites can be added to the placement list by selecting button 1314.

Figure 14:
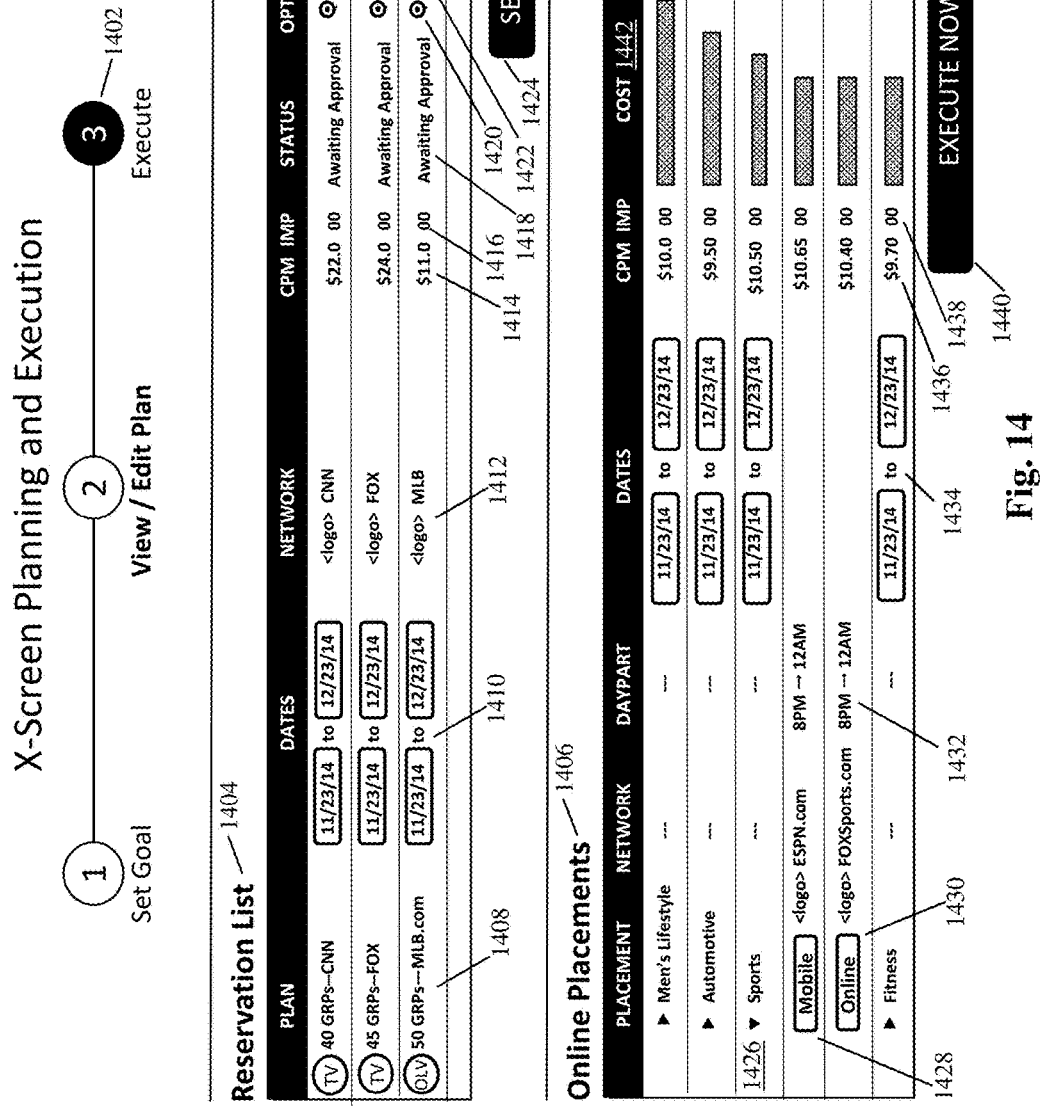
FIG. 14 shows an additional planning tool for cross format campaign including target placements for both TV and digital media.

FIG. 14 shows an additional tool for reviewing a cross format campaign prior to execution 1402, includes target placements for both TV and digital media, and including campaign start and end dates, and projected costs. A button 1440 is provided to move from this tool to a tool as shown for example in FIG. 10 from where a final view of the projected campaign can be examined followed by executing the campaign. At the top of the exemplary user-interface display of FIG. 14 is a TV Reservation List 1404, displaying a summary of networks that have been added to the reservation list where reservations are appropriate or required for placement on a particular network. At the left of Reservation List 1404, placement names are shown 1408, including projected GRPs, network name, and an annunciator icon that includes the particular type of placement, such as TV or OLV. Date ranges 1410 are shown for each placement along with network name and logo 1412. Also shown for each reserved placement are: projected CPM 1414; projected impressions 1416; and status 1418. For each reserved placement, a tool icon 1420 is shown that allows the planner to observe and edit options for the particular reserved placement. Also, for each reserved placement a "Send" button 1422 is provided to send the request for placement reservation as well as a master button 1424 that enables the planner to send all reservation requests at once.

The bottom of the exemplary user-interface display of FIG. 14 is a summary of Online Placements 1406. Here, for each placement, the Placement name is shown along with: Date ranges 1434; projected CPMs 1436; Impressions 1438; and projected Cost 1442. When a planner wishes to see more detail for a given placement such as network and daypart information 1432, an arrow annunciator icon such as that shown for the Sports category 1426 can be clicked, displaying additional detail on specific network placements falling within the selected (Sports) category. In this example, there are two sub-placements within the Sports placement category: ESPN.com shown as a Mobile placement 1428 and FOXSports.com shown as an Online placement 1430. Note that Daypart information 1432 is then viewable for both the ESPN and FOXSports placements.

The processes performed as described herein are implemented as engines (sequential machines) running on one more processors, wherein the engines:

receive input from a user/planner through a realtime user interface;

access various databases;

compute estimated campaign results in realtime;

report those estimated results to the user/planner through the realtime user interface;

enable and control the execution of the advertising campaign; and report to the user/planner the results of the actual advertising campaign.

Note that the quantity and complexity of the data and tasks involved in operating the invention make implementation of the invention impossible without the aid of one or more sequential machines—typically sequential processes operating on the one or more processors referred to above—and also use of a hardware communications infrastructure —typically the Internet. During the analysis and actionable processes involved, millions of data elements must be considered and without using a machine as part of the invention, implementation of the claimed processes would not be possible. Typically a Demand Side Platform (DSP) MUST both analyze and respond to an ad slot opportunity in less than 100 milliseconds. Performing the claimed processes with "pencil and paper" is impossible for many reasons, as is performing the process without the Internet. In fact, the entire process with respect to online advertisements requires an intimate usage of the Internet for the Demand Side Platform to communicate with: supply-side platforms; advertising exchanges; advertising networks; and attribution partners. The DSP must receive bid request packages, place bids, and supply the ads themselves in milliseconds via the Internet. Then, after a campaign has run, the DSP automatically receives attribution data from attribution partners. The preceding description names only some of the automated processes and actions involved in implementing the invention as claimed.

The claims reflect a computerized process since, at this time, computing resources have evolved to include "Cloud-based" computing as described above in the Background section. As such, it is also impossible to predict where (physically) the claimed processes will be executed and/or if they will be distributed across multiple machines. It is also impossible to predict the specific ownership of machines whereupon the claimed processes will be executed, and therefore against whom the claims would protect against should the claims instead have been written as system claims as opposed to the method claims attached hereto.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory machine readable medium, or a non-transitory machine-readable storage medium that can be in a form of a digital circuit, an analog circuit, a magnetic medium, or combination thereof. The application program may be uploaded to, and executed by one or more machines comprising any suitable architecture. The various processes and functions described herein may be either part of microinstruction code or part of one or more application programs, or any combination thereof, which may be executed by one or more CPUs, whether or not such machine(s) or processor(s) are explicitly shown. In addition, various other peripheral units may be connected to machine platforms such as one or more data storage units and printing units.

What is claimed is:

1. A computerized method for generating a user interface facility for efficiently planning a cross platform digital campaign targeting both TV and online ad impressions, whereby one or more processors perform the computerized method comprising:

identifying a fused data set of viewership data that includes TV viewing and digital media viewing of advertisements;

receiving a list of TV advertisements and targeting criteria for a client;

providing for display to a client device, a user interface that comprises a de-duplicated reach selectable element and a duplicated reach selectable element;

generating projected results for a proposed budget split between TV and digital media placement of advertisements for a cross format campaign with de-duplicated reach targeting viewers that have not seen the listed TV advertisements by:

for each of the listed TV advertisements, identifying viewers in the fused data set categorized as not watching the listed TV advertisements;

identifying viewer characteristics of the viewers categorized as not watching the listed TV advertisements;

identifying characteristics of online media properties visited by the viewers in the fused data set categorized as not watching the listed TV advertisements; and determining the projected results for the proposed budget split based on the viewer characteristics, the characteristics of the online media properties, a historical database containing data from digital media advertising campaigns, and the targeting criteria; and in response to user interaction with the de-duplicated reach selectable element, providing for display via the user interface, the de-duplicated reach selectable element, the duplicated reach selectable element, the proposed budget split for the cross format campaign with de-duplicated reach targeting viewers that have not seen the listed TV advertisements, and the projected results of the cross format campaign.

2. The computerized method of claim 1 wherein the projected results comprise at least one of: reach; reach percentage; gross rating points; cost per unit of impressions; gross impressions; average frequency; total cost; revenue per cost per unit of impressions; or revenue per gross rating point.

3. The computerized method of claim 1 wherein the projected results comprise at least one of incremental reach; change in average frequency; or savings per cost per unit of impressions.

4. The computerized method of claim 1 wherein the projected results are automatically revised in response to changes made by a user via the user interface; and the revised projected results are automatically displayed in the user interface.

5. The computerized method of claim 1, further comprising:

generating additional projected results for a second proposed budget split between TV and digital media placement of advertisements for a second cross format campaign with duplicated reach targeting viewers that have seen the listed TV advertisements by:

identifying viewers in the fused data set categorized as watching the listed TV advertisements;

identifying additional viewer characteristics of the viewers categorized as watching the listed TV advertisements; and identifying additional characteristics of online media properties visited by the viewers in the fused data set categorized as watching the listed TV advertisements.

6. The computerized method of claim 5 wherein generating the additional projected results comprises:

determining the additional projected results for the second proposed budget split based on the additional viewer characteristics, the additional characteristics of the online media properties, the historical database, and the targeting criteria.

7. The computerized method of claim 6 further comprising:

in response to user interaction with the duplicated reach selectable element, providing for display via the user interface, the second proposed budget split for the second cross format campaign with duplicated reach targeting viewers that have seen the listed TV advertisements, and the additional projected results of the second cross format campaign.

8. The computerized method of claim 1 further comprising:

providing for display to the client device via the user interface a low-cost-reach selectable element with the de-duplicated reach selectable element and the duplicated reach selectable element.

9. The computerized method of claim 1 further comprising:

providing for display a budget split input mechanism via the user interface with the de-duplicated reach selectable element and the duplicated reach selectable element.

10. The computerized method of claim 9 further comprising:

in response to a user interaction with the budget input split mechanism:

identifying a modified budget split;

determining a modified projected result corresponding to the modified budget split; and providing the modified projected result for display via the user interface.

11. A computerized method for generating a user interface facility for efficiently planning a cross platform digital campaign targeting both TV and online ad impressions, whereby one or more processors perform the computerized method comprising:

identifying a fused data set of viewership data that includes TV viewing and digital media viewing of advertisements;

receiving a list of TV advertisements and targeting criteria for a client;

providing for display to a client device a user interface that comprises a de-duplicated reach selectable element and a duplicated reach selectable element;

generate projected results for a proposed budget split between TV and digital media placement of advertisements for a cross format campaign with increased frequency targeting viewers that have seen the listed TV advertisements by:

for each of the listed TV advertisements, identifying viewers in the fused data set categorized as watching the listed TV advertisements;

identifying viewer characteristics of the viewers categorized as watching the listed TV advertisements, and identifying characteristics of online media properties visited by the viewers in the fused data set categorized as watching the listed TV advertisements; and determining the projected results for the proposed budget split based on the viewer characteristics, the characteristics of the online media properties, a historical database containing data from digital media advertising campaigns, and the targeting criteria; and in response to user interaction with the de-duplicated reach selectable element, providing for display the de-duplicated reach selectable element, the duplicated reach selectable element, the proposed budget split for the cross format campaign with duplicated reach targeting viewers that have seen the listed TV advertisements, and the projected results of the cross format campaign.

12. The computerized method of claim 11 wherein the projected results comprise at least one of: reach; reach percentage; gross rating points; cost per unit of impressions; gross impressions; average frequency; total cost; revenue per cost per unit of impressions; or revenue per gross rating point.

13. The computerized method of claim 11 wherein the projected results comprise at least one of: incremental reach; change in average frequency; or savings per cost per unit of impressions.

14. The computerized method of claim 11 wherein the projected results are automatically revised in response to changes made by a user via the user interface with respect to the targeting criteria; and the revised projected results are automatically displayed in the user interface.

15. The computerized method of claim 11 further comprising:

generating additional projected results for a second proposed budget split between TV and digital media placement of advertisements for a second cross format campaign with de-duplicated reach targeting viewers that have not seen the listed TV advertisements.

16. The computerized method of claim 15 wherein generating the additional projected results comprises:

identifying viewers in the fused data set categorized as not watching the listed TV advertisements; and identifying additional characteristics of online media properties visited by the viewers in the fused data set categorized as not watching the listed TV advertisements.

17. The computerized method of claim 16 wherein generating the additional projected results comprises:

generating the additional projected results for the second proposed budget split based on the additional characteristics of the online media properties, the historical database, and the targeting criteria.

18. The computerized method of claim 17 further comprising:

in response to user interaction with the de-duplicated reach selectable element, providing for display via the user interface, the second proposed budget split for the second cross format campaign with de-duplicated reach targeting viewers that have not seen the listed TV advertisements, and the additional projected results of the second cross format campaign.

19. The computerized method of claim 11 further comprising:

providing for display a budget split input mechanism via the user interface with the de-duplicated reach selectable element and the duplicated reach selectable element.

20. The computerized method of claim 19 further comprising:

in response to a user interaction with the budget split input mechanism:

identifying a modified budget split;

determining a modified projected result corresponding to the modified budget split; and providing the modified projected result for display via the user interface.

21. A system comprising:

at least one processor; and at least one non-transitory computer readable storage medium storing instructions that, when executed by the at least one processor, cause the system to:

identify a fused data set of viewership data that includes TV viewing and digital media viewing of advertisements, and where for a plurality of viewers watching TV advertisements the fused data set includes digital media viewership data for those viewers;

receive a list of TV advertisements and targeting criteria for a client;

provide for display to a client device a user interface that comprises a de-duplicated reach selectable element and a duplicated reach selectable element;

in response to user interaction with the de-duplicated reach selectable element, generate projected results for a processed budget split between TV and digital media placement of advertisements for a cross format campaign with de-duplicated reach targeting viewers that have not seen the listed TV advertisements by:

identifying viewers in the fused data set categorized as not watching the listed TV advertisements;

identifying characteristics of online media properties visited by the viewers in the fused data set categorized as not watching the listed TV advertisements; and determining the projected results for the proposed budget split based on the characteristics of the online media properties, a historical database containing data from digital media advertising campaigns, and the targeting criteria; and provide for display the de-duplicated reach selectable element, the duplicated reach selectable element, the proposed budget split for the cross format campaign with de-duplicated reach targeting viewers that have not seen the listed TV advertisements receiving targeting criteria, and the projected results of the cross format campaign.

22. The system of claim 21 wherein the projected results comprise at least one of: reach; reach percentage; gross rating points; cost per unit of impressions; gross impressions; average frequency; total cost; revenue per cost per unit of impressions; or revenue per gross rating point.

23. The system of claim 21 wherein the projected results comprise at least one of: incremental reach; change in average frequency; or savings per cost per unit of impressions.

24. The system of claim 21, wherein the projected results are automatically revised in response to changes made by a user via the user interface with respect to the targeting criteria; and the revised projected results are automatically displayed in the user interface.

25. The system of claim 21 further comprising instructions that, when executed by the at least one processor cause the system to:

generate additional projected results for a second proposed budget split between TV and digital media placement of advertisements for a second cross format campaign with duplicated reach targeting viewers that have seen the listed TV advertisements.

26. The system of claim 25, further comprising instructions that, when executed by the at least one processor, cause the system to generate the additional projected results by:
identifying viewers in the fused data set categorized as watching the listed TV advertisements; and
identifying additional characteristics of online media properties visited by the viewers in the fused data set categorized as watching the listed TV advertisements.

27. The system of claim 26 further comprising instructions that, when executed by the at least one processor, cause the system to:
generate the additional projected results for the second proposed budget split based on the additional characteristics of the online media properties, the historical database, and the targeting criteria.

28. The system of claim 27 further comprising instructions that, when executed by the at least one processor, cause the system to:
in response to user interaction with the duplicated reach selectable element, providing for display via the user interface, the second proposed budget split for the second cross format campaign with duplicated reach targeting viewers that have seen the listed TV advertisements, and the additional projected results of the second cross format campaign.

29. The system of claim 21 further comprising instructions that, when executed by the at least one processor, cause the system to:
provide for display a budget split input mechanism via the user interface with the de-duplicated reach selectable element and the duplicated reach selectable element.

30. The system claim 29 further comprising instructions that, when executed by the at least one processor, cause the system to, in response to user interaction with the budget split input mechanism:
identify a modified budget split;
determine a modified projected result corresponding to the modified budget split; and
provide the modified projected result for display via the user interface.

* * * * *